United States Patent
Kajino et al.

(10) Patent No.: US 6,776,273 B2
(45) Date of Patent: Aug. 17, 2004

(54) STARTER HAVING BRAKING MEMBER FOR ONE-WAY CLUTCH

(75) Inventors: Sadayoshi Kajino, Nagoya (JP); Youichi Hasegawa, Kasugai (JP); Hiroyasu Omiyama, Sawa-gun (JP); Syuichi Aoki, Oura-gun (JP)

(73) Assignees: Denso Corporation, Kariya (JP); Sawafuji Electric Co., Ltd., Tokyo (JP)

( * ) Notice: Subject to any disclaimer, the term of this patent is extended or adjusted under 35 U.S.C. 154(b) by 0 days.

(21) Appl. No.: 10/329,801

(22) Filed: Dec. 27, 2002

(65) Prior Publication Data

US 2003/0136624 A1 Jul. 24, 2003

(30) Foreign Application Priority Data

Jan. 18, 2002 (JP) ........................................ 2002-009895

(51) Int. Cl.[7] .......................... F02N 15/02; F02N 11/00; F16D 67/02
(52) U.S. Cl. ........................ 192/12 B; 74/7 C; 192/215
(58) Field of Search ................................ 192/12 B, 215, 192/42, 63; 74/7 C, 7 E

(56) References Cited

U.S. PATENT DOCUMENTS

| | | | | | |
|---|---|---|---|---|---|
| 1,920,794 | A | * | 8/1933 | Jackson et al. ................. | 74/6 |
| 3,747,719 | A | * | 7/1973 | Ciolli .............................. | 74/6 |
| 3,771,372 | A | * | 11/1973 | Asahi et al. ................... | 74/7 R |
| 3,868,858 | A | * | 3/1975 | Reichardt et al. ............. | 74/7 R |
| 4,504,543 | A | * | 3/1985 | Yamashita et al. .......... | 428/338 |
| 4,561,316 | A | * | 12/1985 | Bolz et al. ..................... | 74/7 E |
| 4,776,224 | A | * | 10/1988 | Maezawa et al. ............. | 74/7 E |
| 5,159,908 | A | * | 11/1992 | Eyermann et al. ........ | 123/179.1 |
| 5,167,162 | A | * | 12/1992 | Nagashima et al. .......... | 74/7 E |
| 2003/0097891 | A1 | * | 5/2003 | Siems et al. .................. | 74/7 E |

FOREIGN PATENT DOCUMENTS

| | | |
|---|---|---|
| DE | 7325835 | 1/1974 |
| DE | 41 15 940 A1 | 11/1992 |
| JP | U 64-39475 | 3/1989 |

* cited by examiner

Primary Examiner—Rodney H. Bonck
(74) Attorney, Agent, or Firm—Oliff & Berridge, PLC

(57) ABSTRACT

A starter having a one-way clutch connects with an output shaft via helical spline. A braking member is provided in a bearing portion of a center case adjacent to an end of the center case away from the motor. The clutch moves toward the rear via a lever when the starter is stopped, and a flange portion, provided at a rear end of a barrel portion, presses against the braking member. As a result, the rotation of the clutch stops within a short time period.

7 Claims, 4 Drawing Sheets

STARTER HAVING BRAKING MEMBER FOR ONE-WAY CLUTCH

CROSS REFERENCE TO RELATED APPLICATION

This application is based on and incorporates herein by reference Japanese Patent Application No. 2002-9895 filed on Jan. 18, 2002.

FIELD OF THE INVENTION

The present invention relates to a starter in which a pinion gear moves on an output shaft with a one-way clutch and engages with a ring gear of an engine.

BACKGROUND OF THE INVENTION

A starter of related art that is disclosed in JP-U-64-39475 includes a one-way clutch and an electromagnetic switch. The one-way clutch is connected with an output shaft via a helical spline. The electromagnetic switch performs on and off control of a current supply to a motor. The one-way clutch is pushed forward with a pinion gear by a lever that is driven by an attraction force of the electromagnetic switch. When the engine is started, the one-way clutch is pushed in the axial direction of the starter toward the rear due to counterforce of return springs included in the switch. Then, the one-way clutch is brought into contact with a washer fixed to the output shaft and stopped.

Since the washer, which functions as a stopper to stop the movement of the clutch, is fixed to the output shaft, a thrust force is applied to the output shaft. The force also affects a bearing at which a rear end of the output shaft is supported. Therefore, the bearing needs to be strong enough to tolerate the force. Such a bearing becomes large in the axial direction, and the starter having the bearing becomes large in the axial direction.

Additionally, a motor of the starter coasts for a while after power supply to the motor is stopped. If restarting the starter by mistake during this period, an impact on the pinion gear and the ring gear is larger than when restarting the starter from a standstill. Therefore, the gears become damaged when starting the starter while the starter is coasting.

SUMMARY OF THE INVENTION

The present invention therefore has an objective to provide a starter, a one-way clutch of which is attracted on the output shaft without being affected by thrust force, and a motor which is stopped immediately after power supply to the motor is stopped. In a starter of the present invention, a pinion gear of a starter engages with a ring gear of an engine by pushing a one-way clutch in the direction away from the motor via a lever. The lever is driven by an attraction force of an electromagnetic switch. The starter includes a braking member. The braking member applies a braking force to the one-way clutch by being placed it against the one-way clutch or a case, which causes friction, when the clutch is attracted toward the motor via the lever.

With this configuration, the rotation of the one-way clutch is stopped by the braking member immediately after the power supply to the motor is stopped by the electromagnetic switch. As a result, the coasting of an armature stops in a short time. This reduces damages to the gears if that the starter is restarted by mistake immediately after the starter is stopped. The damage can be reduced because the impact is reduced by the braking member when the pinion gear hits the ring gear.

When the one-way clutch is attracted by the lever, the one-way clutch is stopped by the case via the braking member and the thrust force is absorbed by the case. That is, large thrust forces are not applied to the output shaft and the rotor shaft of the motor (armature shaft). Therefore, the size of the bearing can be reduced in the axial direction, and the length of the starter can be reduced.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings.

Figure 1:
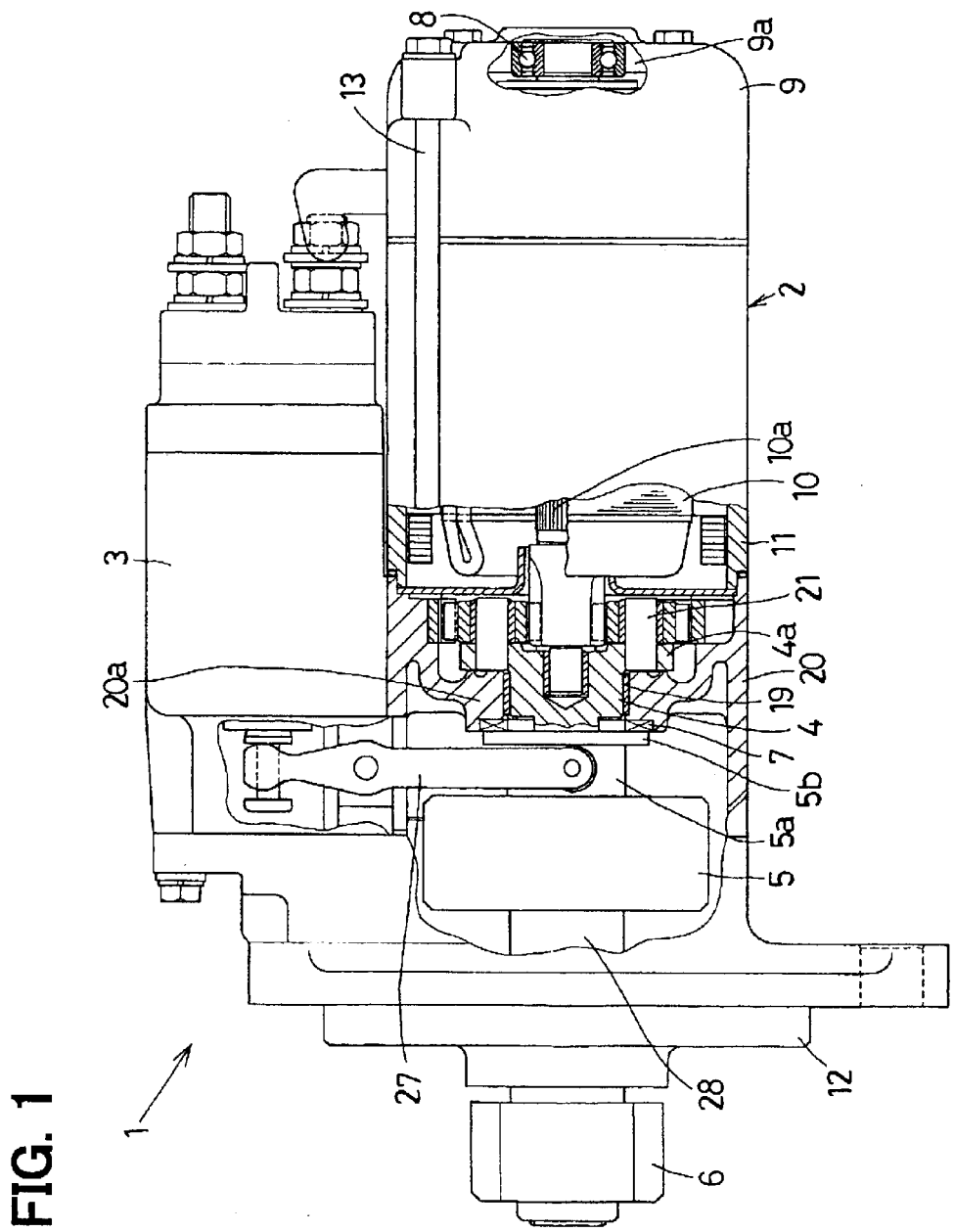
FIG. 1 is a side view of a starter according to an embodiment of the present invention.

Referring to FIG. 1, a starter 1 includes a motor 2, an electromagnetic switch 3, an output shaft 4, a one-way clutch 5, a pinion gear 6, and a braking member 7. The starter 1 produces rotary motion, and the electromagnetic switch 3 performs on and off control of the power supplied to the motor 2. The output shaft 4 rotates when the rotary motion is transferred from the motor 2. Simultaneously, the rotary motion of the output shaft 4 is transferred to the pinion gear 6 via the one-way clutch 5. The one-way clutch 5 is fixed to the output shaft 4. The braking member 7 stops the rotation of the clutch 5 immediately after the motor 2 is stopped.

Figure 2:
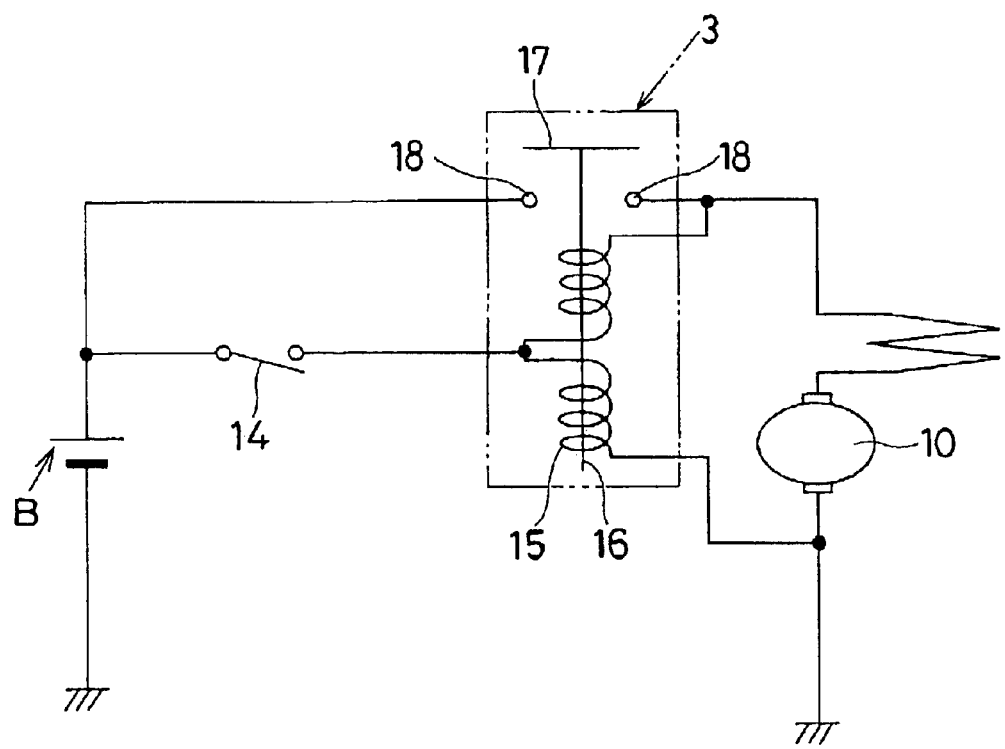
FIG. 2 is a electrical circuit diagram of the starter.

The motor 2 is a DC motor that includes an armature 10. One end of the shaft of the armature 10 is supported with a bearing portion 9a of the end frame 9 via a ball bearing 8. Referring to FIG. 2, when the switch 3 is closed and the power supply circuit of the motor 2 is closed, the motor 2 is supplied with power and the armature 10 starts producing rotary motion.

The end frame 9 covers the rear part of the motor 2, and mounts to the motor yoke 11. The end frame 9 is fixed to a housing 12 with a through bolt 13. The electromagnetic switch 3 includes a field coil 15 and a plunger 16. The coil 15 is energized when an IG key is turned on and current is supplied. The plunger 16 is inserted in the coil 15 so that it slides against the inner periphery of the coil 15. When the plunger 16 is pulled due to the magnetic force produced by the field coil 15, a traveling contact 17 fixed to the plunger 16 comes into contact with a pair of fixed contacts 18. As a result, the power supply circuit of the motor 2 is closed.

Figure 3:
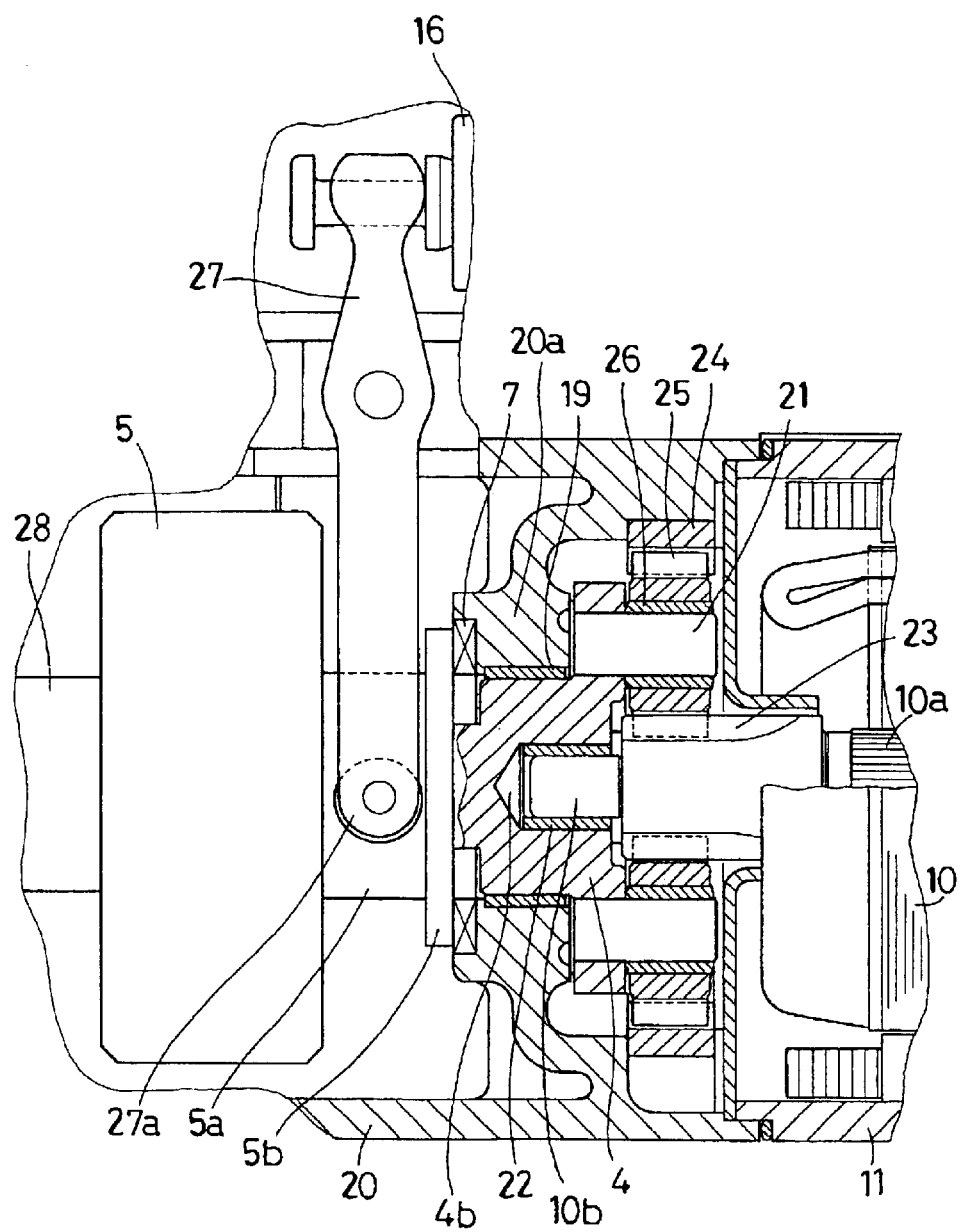
FIG. 3 is a magnified cross-sectional view around a braking member.

The output shaft 4 is connected concentrically with an armature shaft 10a via a decelerator, and supported by a center case 20 via a bearing 19 so that it can freely rotate. An end of the output shaft 4 adjacent to the motor 2 has a brim-shaped portion 4a, and a plurality of carrier pins 21 is press-fitted into the brim-shaped portion 4a. The output shaft 4 has a hollow portion 4b. The armature shaft 10a has a small-diameter portion 10*b* at its tip. The small-diameter portion 10*b* is inserted into the hollow portion 4*b* via a bearing 22 as shown in FIG. 3.

The decelerator uses a planetary gear decelerating mechanism including a sun gear 23, an internal gear 24, and a plurality of planetary gears 25. The sun gear 23 is fixed to the armature shaft 10*a*. The internal gear 24 is a ring-shaped gear, the rotation of which is restricted by the center case 20. The planetary gears 25, which are supported by the carrier pins 21 via a bearing 26, engage the sun gear 23 with the internal gear 24.

When the armature 10 rotates, the rotation of the sun gear 23 is transferred to the planetary gears 25. As a result, the planetary gears start rotating and revolving around the sun gear 23. The orbital motion of the planetary gears 25 is transferred to the output shaft 4 as rotary power.

The one-way clutch 5 is a roller clutch that is commonly used in starters, and has a barrel portion 5*a* and a flange portion 5*b*. The barrel portion 5*a* has a helical spline on its inner periphery. The barrel portion 5*a* is placed so that it can move on an outer periphery of the output shaft 4 by the helical spline. The barrel portion 5*a* is also connected to the plunger 16 of the switch 3 via a lever 27.

When the starter 1 is stopped, the one-way clutch 5 is moved toward the motor 2, via the lever 27, by the counterforce of a return spring included in the switch 3. The flange portion 5*b* is located at the rear end of the barrel portion 5*a*, and pressed against the braking member 7. This ensures that the braking member 7 has contact with the one-way clutch 5 or the center case 20. Therefore, the rotation of the one-way clutch 5 is stopped within a short time period.

The pinion gear 6 is connected to a front end of a pinion tube 28, which is integrated with an inner ring of the one-way clutch 5. When the engine is started, the pinion gear 6 moves on the output shaft 4 toward the front, and engages with the ring gear to transfer the rotary motion of the motor 2 to the ring gear. The pinion tube 28 in a cylindrical shape is fitted to the outer periphery of the output shaft 4 and is supported by the housing 12 via a bearing (not shown).

Figure 4:
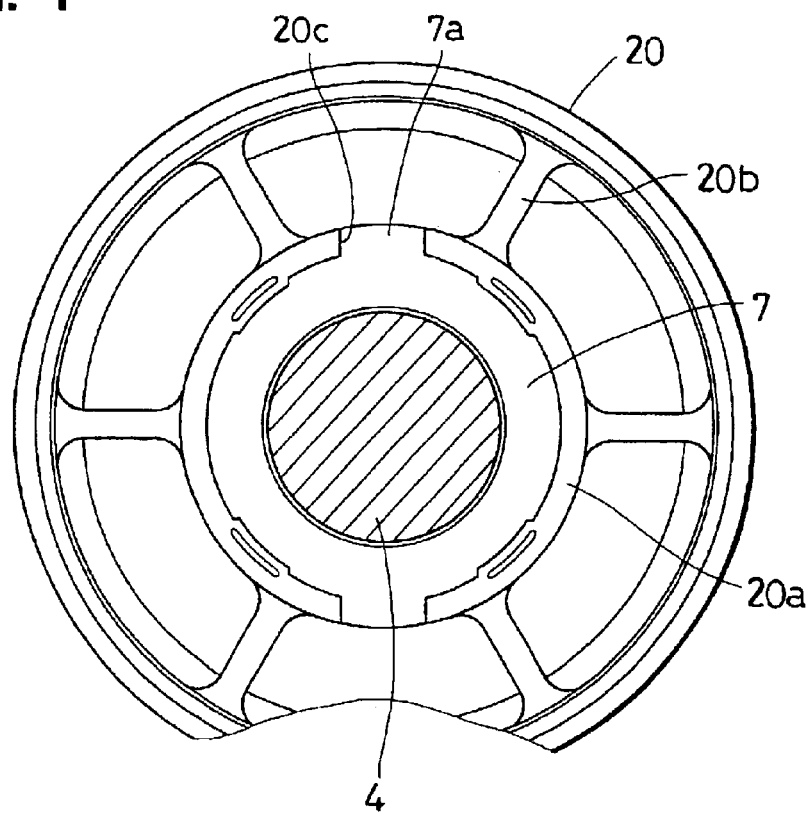
FIG. 4 is a front view of the braking member and a center case.
Figure 5:
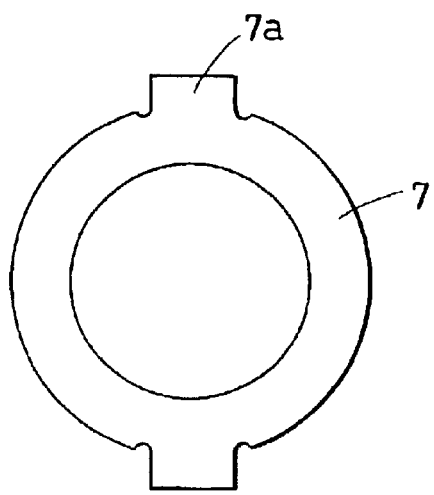
FIG. 5 is a front view of the braking member.

The center case 20 is located between the housing 12 and the motor yoke 11 and covers the decelerator. The center case 20 has a ring-shaped bearing portion 20*a* with an inner periphery that houses the bearing 19. The bearing portion 20*a* is connected to the center case 20 by a plurality of ribs 20*b* as shown in FIG. 4.

The braking member 7 is positioned inside the bearing portion 20*a* adjacent to the end of the center case 20 away from the motor 2, and is crimped to the bearing portion 20*a*. The braking member 7 is made of bakelite in which a cloth soaked with impregnation oil is inserted. The braking member 7 has a shape of a ring with lugs 7*a* that are positioned so that they are opposed to each other in the radial direction. The lugs 7*a* are inserted into hollow portions 20*c* provided in the bearing portion 20*a* to prevent the braking member 7 from moving in the direction of rotation. This improves the braking effect of the braking member 7. Therefore, the rotation of the one-way clutch 5 stops within a short time period.

Next, operations of the starter 1 will be explained.

When the IG key 14 is turned on and power is supplied to the field coil 15 of the electromagnetic switch 3, the plunger 16 is pulled by a magnetic force. The movement of the plunger 16 is transferred to the one-way clutch 5 via the lever 27. As a result, the one-way clutch 5 is pushed forward on the output shaft 4, and the pinion gear 6 is brought into contact with the ring gear.

When the plunger 16 is further pulled, the traveling contact 17 touches the fixed contacts 18. This closes the power supply circuit of the motor 2. Then, power is supplied to the motor 2 from the battery B and rotary motion is produced by the armature 10. When the rotation speed of the armature 10 is reduced by the decelerator and the rotation at the reduced speed is transferred to the output shaft 4, the rotation of the output shaft 4 is transferred to the one-way clutch 5. The pinion gear 6 moves to a position to engage with the ring gear. Then, the pinion gear 6 engages with the ring gear and the rotation of the output shaft 4 is transferred to the ring gear via the pinion gear 6, which permits cranking of the engine.

When the IG key 14 is turned off and power supply to the field coil 15 is stopped, the attraction force decreases. As a result, the plunger 16 is attracted by the return spring, and the traveling contact 17 loses contact with the fixed contacts 18. Therefore, the power supply to the motor 2 stops. When the movement of the plunger 16 is transferred to the one-way clutch 5 via the lever 27, the one-way clutch 5 is attracted toward the rear. As a result, the pinion gear 6 moves away from the ring gear and moves back to its position before the engine was started together with the one-way clutch 5.

The present invention produces the following effects.

When the one-way clutch 5 is attracted toward the rear via the lever 27, the flange portion 5*b* of the clutch 5 is pressed against the braking member 7, which causes friction. As a result, a braking force is applied to the clutch 5, and the coasting of the armature 10 stops within a short time period. This reduces impact when the pinion gear hits the ring gear in the case that the starter 1 is restarted by mistake. Therefore, damage to the pinion gear 6 and the ring gear can be reduced.

Although the flange portion 5*b* is pressed against the braking member 7, the impregnation oil used in the braking member 7 can reduce noise and wear of the braking member 7.

The braking member 7 is fixed to the center case 20 in the bearing portion. Therefore, the thrust force produced when the one-way clutch 5 hits the braking member 7 can be absorbed by the center case 20. Since large thrust forces are not applied to the output shaft 4 and the armature shaft 10*a*, the bearing portion 9*a* is not required to absorb a large thrust force. Therefore, the length of the bearing portion 9*a* can be reduced in the axial direction, and this reduces the length of the starter 1.

Furthermore, a large braking area can be provided by fitting the braking member 7 to the center case 20 compared to an area provided by fitting a braking member to a clutch. This is because the center case 20 can provide more space for the braking member 7 to be fixed than the clutch.

Since the rotation of the one-way clutch 5 can be stopped within a short time period, the wear of the lever engaging portion 27*a* that engages with the barrel portion 5*a* can be reduced. Therefore, the size of the lever engaging portion 27*a* can be reduced. This reduces the length of the one-way clutch 5 in the axial direction, and the length of the starter 1.

While the starter is stopped, the flange portion 5*b* is pressed against the braking member 7 by a spring force. As a result, a gap between the output shaft 4 and the braking member 7 is reduced. This reduces spillage of the oil, which is used for the decelerator, through the gap and in the direction of the clutch 5. It also helps prevent debris, such as water and dust, from entering the housing 12, a gear portion of the decelerator, and the motor 2.

The present invention should not be limited to the embodiment previously discussed and shown in the figures, but may be implemented in various ways without departing from the spirit of the invention.

Figure 6:
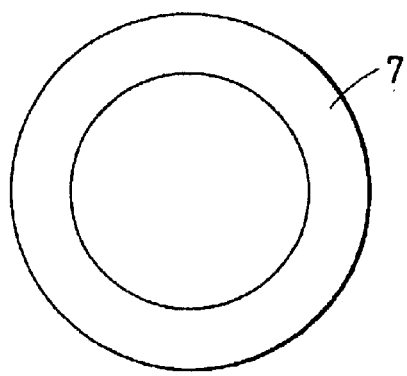
FIG. 6 is a front view of the braking member.

For example, the braking member 7 can be provided without lugs 7a as shown in FIG. 6, as long as it can be crimped to the center case 20 in the bearing portion to limit its rotation. The braking member 7 can have just one lug 7a or multiple lugs 7a. The braking member 7 is not limited to a ring shape. It can be in any shape as long as a desired braking force can be applied to the one-way clutch 5.

Moreover, the braking member 7 can be fixed to the flange portion 5b instead of the center case 20. Alternatively, the braking member 7 can be fixed to both, the flange portion 5b and the center case 20. The ball bearing 8 can be a plane bearing, which is less expensive than the ball bearing.

What is claimed is:

1. A starter, comprising:

a motor, wherein the motor has an armature, a shaft end of which is supported with a bearing of an end frame so that the armature freely rotates;

an electromagnetic switch, wherein the electromagnetic switch performs on and off control of power supply to the motor;

an output shaft, wherein the output shaft is rotated by the motor;

a one-way clutch, wherein the one-way clutch has a pinion gear that is movable on the output shaft in the axial direction of the motor and is fitted to the output shaft via a helical spline to transfer rotary motion of the output shaft to the pinion gear, and the pinion, gear engages with a ring gear of an engine by activating the one-way clutch in a direction away from the motor using a lever that is driven by an attraction force of the electromagnetic switch;

a case, wherein the case has a bearing adjacent to the motor for supporting the output shaft; and a braking member comprising impregnation oil and having a plurality of lugs formed on an outer periphery of the braking member, wherein the braking member is fixed between the one-way clutch and the case, and applies a braking force to the one-way clutch, the braking force being produced by friction when the one-way clutch is attracted toward the motor via the lever and the braking member engages with the case to prevent the braking member from rotating.

2. The starter according to claim 1, wherein:

the braking member is fixed to the case; and the braking force is produced by friction between the braking member and the one-way clutch when the one-way clutch is attracted toward the motor via the lever.

3. The starter according to claim 1, wherein:

the braking member is fixed to the one-way clutch; and the braking force is produced by friction between the braking member and the case when the one-way clutch is attracted toward the motor via the lever.

4. The starter according to claim 1, wherein:

the braking member is separately fixed to each of the one-way clutch and the case; and the braking force is produced by friction between each braking member when the one-way clutch is attracted toward the motor via the lever.

5. The starter according to claim 1, wherein the one-way clutch is pressed against the case via the braking member by a counterforce of a return spring included in the electromagnetic switch when the one-way clutch is attracted toward the motor via the lever.

6. The starter according to claim 5, wherein the output shaft makes close contact with the braking member when the one-way clutch is pressed against the braking member.

7. The starter according to claim 6, further comprising:

a decelerator that reduces a rotational speed of the armature and transfers rotary motion of the armature at the reduced speed to the output shaft, wherein the braking member is located adjacent to the decelerator away from the motor.

\* \* \* \* \*